(12) United States Patent
Kester et al.

(10) Patent No.: US 11,104,410 B2
(45) Date of Patent: Aug. 31, 2021

(54) PROPELLER-POWERED WATERCRAFT SYSTEM AND METHOD OF REMOTE-CONTROLLED WATERWAY NAVIGATION

(71) Applicant: QUANTUM INNOVATIONS, INC., Central Point, OR (US)

(72) Inventors: Norman L. Kester, Rogue River, OR (US); David C. Herbert, Central Point, OR (US)

(73) Assignee: QUANTUM INNOVATIONS, INC., Central Point, OR (US)

( * ) Notice: Subject to any disclaimer, the term of this patent is extended or adjusted under 35 U.S.C. 154(b) by 0 days.

(21) Appl. No.: 16/449,362

(22) Filed: Jun. 22, 2019

(65) Prior Publication Data

US 2020/0331577 A1    Oct. 22, 2020

Related U.S. Application Data

(60) Provisional application No. 62/713,249, filed on Aug. 1, 2018.

(51) Int. Cl.
| | |
|---|---|
| *B63H 25/04* | (2006.01) |
| *G05D 1/00* | (2006.01) |
| *B63B 34/10* | (2020.01) |
| *B63B 34/20* | (2020.01) |

(52) U.S. Cl.
CPC .............. *B63H 25/04* (2013.01); *B63B 34/10* (2020.02); *B63B 34/20* (2020.02); *G05D 1/0016* (2013.01); *B63H 2025/045* (2013.01)

(58) Field of Classification Search
CPC .. B63H 25/04; B63H 2025/045; B63B 34/10; B63B 34/20; G05D 1/0016
See application file for complete search history.

(56) References Cited

U.S. PATENT DOCUMENTS

| | | |
|---|---|---|
| 4,015,555 A | 4/1977 | Tinkham |
| 5,802,492 A | 9/1998 | DeLorme et al. |
| 6,014,940 A * | 1/2000 | Jacobson ................. B60V 1/22 114/271 |
| 6,273,771 B1 * | 8/2001 | Buckley ............... B63H 21/213 114/144 RE |

(Continued)

*Primary Examiner* — Anthony D Wiest
(74) *Attorney, Agent, or Firm* — Jerry Haynes Law

(57) ABSTRACT

A propeller-powered propulsion system and method of remote-controlled waterway navigation is configured to navigate a waterway in a navigation route while being controlled remotely, and being tracked by a GPS system. The watercraft provides a watercraft body that carries a propeller subassembly having multiple propellers that operate independently of each other for variable propulsion and steering. A mobile communication device transmits a command signal to a receiver in the propeller subassembly. A microcontroller converts the command signal to a speed for each propeller, independently of the other. The propeller speeds create a disproportionate level of thrust from each propeller to enable remote controlled steering of the watercraft toward port and starboard directions, at variable speeds, and preprogrammed navigation routes. The mobile communication device also acquires location data of the watercraft body obtained by a GPS system. The microcontroller processes the location data to automate the navigation of the watercraft.

18 Claims, 4 Drawing Sheets

(56) References Cited

U.S. PATENT DOCUMENTS

| | | | |
|---|---|---|---|
| 6,413,125 B1* | 7/2002 | Duer | B63H 7/02 |
| | | | 440/37 |
| 6,450,111 B1 | 9/2002 | Cocksedge | |
| 6,581,536 B1 | 6/2003 | Belloso | |
| 6,860,772 B2 | 3/2005 | Kabakov | |
| 7,047,902 B1 | 5/2006 | Little | |
| 7,090,549 B2* | 8/2006 | Garcia | B63H 7/02 |
| | | | 114/61.1 |
| 7,182,037 B2* | 2/2007 | Otobe | B63B 32/56 |
| | | | 114/343 |
| 8,025,021 B2* | 9/2011 | Gosling | B63G 8/26 |
| | | | 114/330 |
| 9,315,248 B2* | 4/2016 | Williams | B25J 9/08 |
| 10,059,418 B1* | 8/2018 | Miles | B63H 7/02 |
| 10,106,234 B2* | 10/2018 | Tan | B63H 7/00 |
| 2005/0282447 A1 | 12/2005 | Okuyama | |
| 2007/0017426 A1 | 1/2007 | Kaji et al. | |
| 2010/0075588 A1* | 3/2010 | Haneline | F04D 29/547 |
| | | | 454/118 |
| 2011/0109179 A1 | 5/2011 | Akutsu et al. | |
| 2014/0172197 A1 | 6/2014 | Ganz et al. | |
| 2017/0253314 A1 | 9/2017 | Ward | |
| 2018/0004209 A1 | 1/2018 | Yamaha | |

\* cited by examiner

PROPELLER-POWERED WATERCRAFT SYSTEM AND METHOD OF REMOTE-CONTROLLED WATERWAY NAVIGATION

CROSS-REFERENCE TO RELATED APPLICATIONS

This application claims the benefit of U.S. provisional application No. 62/713,249, filed Aug. 1, 2018 and entitled PORTABLE INDEPENDENT PROPULSION SYSTEM WITH INTEGRATED NAVIGATION AND WIRELESS REMOTE CONTROL FOR PERSONAL WATERCRAFT, which provisional application is incorporated by reference herein in its entirety.

FIELD OF THE INVENTION

The present invention relates generally to a propeller-powered watercraft and method of remote-controlled waterway navigation. More so, the present invention relates to a watercraft configured to navigate a waterway along at least one navigation route while being controlled remotely, and being tracked by a GPS system; whereby the watercraft provides a watercraft body that carries a propeller subassembly having multiple propellers that operate independently of each other for variable propulsion and steering; whereby a mobile communication device transmits a command signal to a receiver in the propeller subassembly; and whereby the mobile communication device is also operable to acquire location data of the watercraft body obtained by a GPS system to automate the navigation of the watercraft along at least one navigation route.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, watercraft, such as airboats are propelled by power driven propellers operative in the sense of an airplane propeller. Steering of such propeller-powered watercraft is often accomplished through steering vanes or rudders of generally conventional design. Often, a propeller drive is provided as a part of an inboard, outboard, or inboard/outboard motor and propeller drive assembly properly sized for the boat and its handling requirements.

Generally, an unmanned watercraft is a boat without a human controller aboard. The navigation of such an unmanned watercraft is controlled either autonomously by onboard computers, or by a wireless remote control of an operator on the ground or in another vehicle. Unmanned vessels are usually deployed for military and special operation applications, but are also used in a growing number of civil applications, such as policing and firefighting, and nonmilitary security work, such as inspection of power or pipelines. Furthermore, in some instances, autonomous control is employed to navigate the watercraft. The rise in autonomously controlled vessels had led to GPS systems being installed on the unmanned watercraft, which facilitates navigation through waterways.

Other proposals have involved watercraft and waterway navigation systems. The problem with these watercraft systems is that they do not operate remotely to follow a navigational route. Also, the propellers do not operate independently of each other and the watercraft cannot be tracked to program a navigation route. Even though the above cited watercraft and waterway navigation systems meet some of the needs of the market, a watercraft configured to navigate a waterway along at least one navigation route while being controlled remotely, and while being tracked by a GPS system; and that provides a watercraft body that carries a propeller subassembly having multiple propellers that operate independently of each other for variable propulsion and steering; and further provides a mobile communication device that transmits a command signal to a receiver in the propeller subassembly; whereby the mobile communication device is operable to acquire location data of the watercraft body obtained by a GPS system to automate navigation of the watercraft along navigation routes, is still desired.

SUMMARY

Illustrative embodiments of the disclosure are generally directed to a propeller-powered watercraft and method of remote-controlled waterway navigation. The watercraft is configured to navigate a waterway along at least one navigation route while being controlled remotely, and being tracked by a GPS system. The watercraft provides a watercraft body that carries a propeller subassembly having multiple propellers that operate independently of each other for variable propulsion and steering. A mobile communication device transmits a command signal to a receiver in the propeller subassembly. A microcontroller converts the command signal to at least one speed for each propeller, independently of the other.

The propeller speeds create a disproportionate level of thrust from each propeller so as to enable remote controlled steering of the watercraft toward the port and starboard directions, at variable speeds, and preprogrammed navigation routes. For example, as the propeller speeds are varied, the watercraft body accelerates, decelerates, and steers port side or starboard side. The remote-control functionality of the watercraft frees the watercraft operator to occupy any location in or close to the watercraft body, while remotely controlling the operation of the propeller subassembly.

The mobile communication device is operable to acquire location data of the watercraft body obtained by a GPS system. The microcontroller processes the location data to automate the navigation of the watercraft along at least one navigation route. The location data may be combined with the command signal to navigate the watercraft body based on the location in the waterway. The navigation route may include: a waypoint navigation, a home point return navigation, a steady course navigation, valet navigation, and stationary positioning.

One aspect of a propeller-powered watercraft and method of remote-controlled waterway navigation, the watercraft comprising:

a watercraft body defined by a bow, a stern, a freeboard region, and a draft region;

a propeller subassembly joined to the freeboard region of the watercraft, proximal to the stern, the propeller subassembly comprising a plurality of propellers independently operable to propel and steer the watercraft body;

at least one motor powering the propeller subassembly;

multiple electronic speed controllers regulating the motor;

a microcomputer operatively connected to the electronic speed controller, the microcomputer comprising software operable to control the electronic speed controller;

a receiver operatively connected to the microcomputer and the propeller subassembly, the receiver operable to receive the command signal, whereby the microcontroller converts the command signal to at least one speed for each propeller independently of the other; and a mobile communication device being operable to transmit the command signal, the mobile communication device further being operable to acquire location data of the watercraft body obtained by a GPS system, whereby the microcontroller processes the location data to automate navigation of the watercraft.

In another aspect, the propulsion system further comprises a shroud with integrated motor mount that covers and mounts the propeller motor.

In another aspect, the watercraft further comprises a frame supporting the motor mount.

In another aspect, the propellers comprise two spaced-apart, coplanar propellers.

In another aspect, the propellers comprise a plurality of broad, angled blades.

In another aspect, the motor comprises a DC motor.

In another aspect, the microcontroller comprising a general purpose input/output header operatively connected to the electronic speed controllers.

In another aspect, the propulsion system further comprises a cable control device, the cable control device transmitting the command signal to the electronic speed control (ESC).

In another aspect, the microcontroller processes the location data to automate the navigation of the propulsion system in at least one navigation route.

In another aspect, the navigation route includes at least one of the following: a waypoint navigation, a home point return navigation, a steady course navigation, valet navigation, and stationary positioning.

In another aspect, the microcomputer comprises software operable to control the electronic speed controller through a pulse width modulation signal.

In another aspect, the personal communication device comprises an operating system.

In another aspect, the mobile communication device communicates with the receiver and the GPS system through Wi-Fi, or Bluetooth, or both.

In another aspect, the watercraft further comprises a voltage distribution board distributing power from the battery to the DC motor.

In another aspect, the battery powers at least one of the following: the motor, the electronic speed controllers, the microcomputer, and the voltage distribution board.

In another aspect, the propulsion system operator interfaces with the mobile communication device to transmit the command signal to the receiver, whereby the microcomputer interprets the command signal and transmits the pulse width modulation signal to the electronic speed controllers, whereby the electronic speed controllers transmit voltage to the motor, whereby the motor spins the propellers, whereby the propellers create thrust to propel and steer the propulsion system.

In another aspect, the propulsion system is at least one of the following: a kayak, a flat-bottomed boat, a dual aquatic craft, a multi-hulled aquatic craft, an outrigger, and a catamaran.

In another aspect, the electronic speed controller is operable at 80 amps or more.

In another aspect, the personal communication device uses an operating system, including: iOS, Android, Linux, Windows, and the like.

One objective of the present invention is to navigate a waterway in a preprogrammed navigation route while being controlled remotely, and being tracked by a GPS system.

Another objective is to provide an efficient remote-control command system for operating a propeller subassembly of a propulsion system.

Another objective is to free a propulsion system operator to occupy any location in or close to the propulsion system while remotely controlling the operation of the propeller subassembly by means of a remote-control unit, personal communication device, or cable-controlled device.

Another objective is to track the propulsion system with a GPS system, and navigate the propulsion system based on location data.

Another objective is to minimize the constant positional corrections of the propulsion system.

Another objective is to add functionality to personal watercraft.

Yet another objective is to provide a single button control for the navigation route.

Yet another objective is to provide a safety feature, such as attitude awareness with system shutoff when the angle exceeds a predetermined value.

Yet another objective is to provide valet navigation that navigates the watercraft offshore for security, and then returns the watercraft to the point of origin when the operator is ready to board the watercraft.

Yet another objective is to provide shallow water navigation through use of elevated propellers that eliminate components below the waterline, creating a "rudderless" watercraft.

Yet another objective is to provide a propulsion system that has a simple construction, is compact, and convenient to operate.

Yet another objective is to provide a durable propulsion system to assure a long useful life with normal care.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
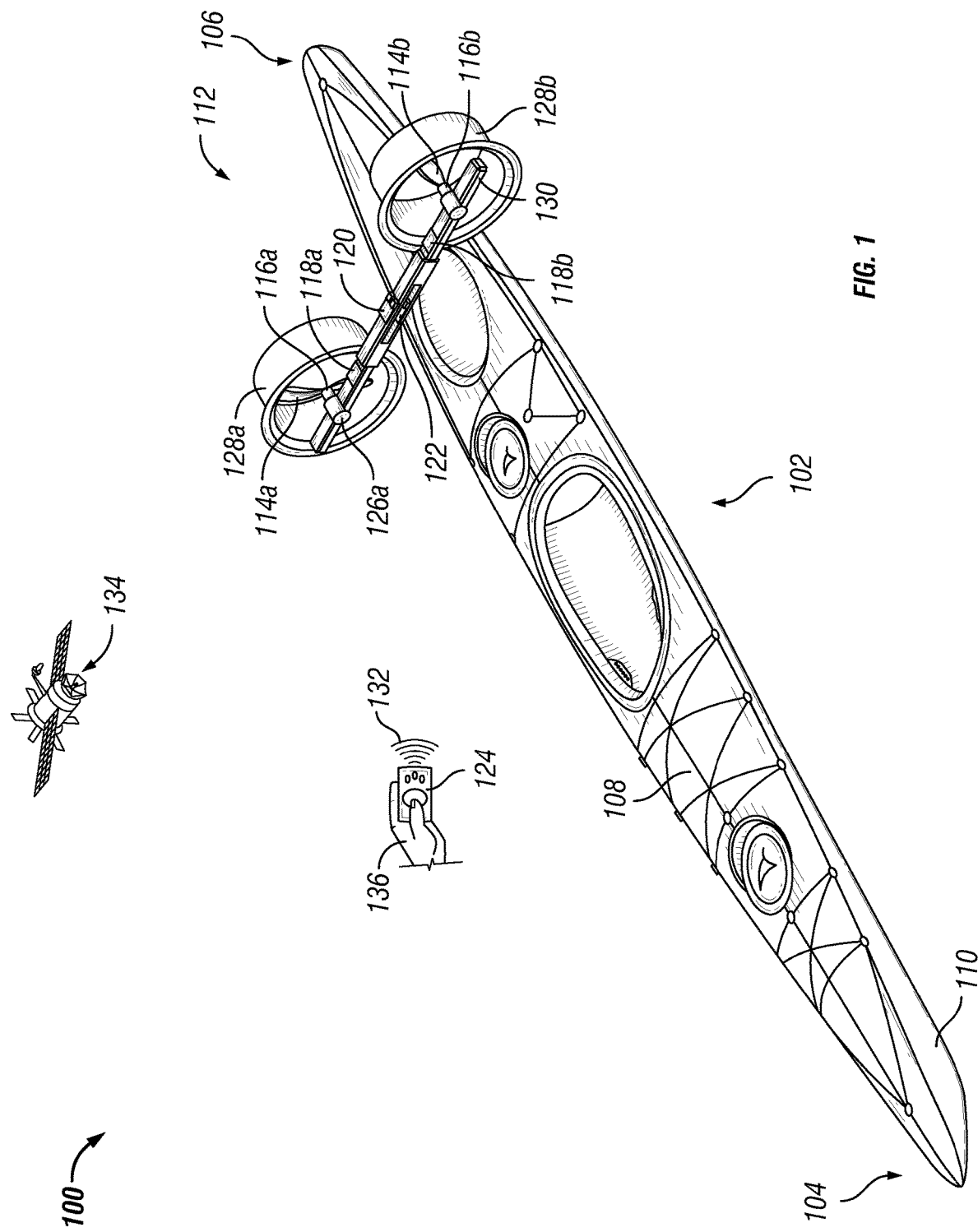
FIG. 1 illustrates a perspective view of an exemplary propeller-powered propulsion system, showing a mobile communication device and a GPS system controlling the speed, direction, and navigation route of a propulsion system body, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A propeller-powered propulsion system 100 and method 700 of remote-controlled waterway navigation is referenced in FIGS. 1-7. The propeller-powered propulsion system 100, hereafter "watercraft 100" is operable to navigate a waterway, or any other body of water, under remote control. The watercraft 100 is also operable to navigate while being tracked by a GPS system 134 that allows for the watercraft 100 to navigate in a preprogrammed navigation route, based on location data. The watercraft 100 is propeller-powered, with multiple independently powered propeller speeds that create a disproportionate level of thrust from each propeller 114a, 114b so as to enable remote controlled steering of the watercraft 100 toward the port and starboard directions, at variable speeds, and along the preprogrammed navigation routes.

As referenced in FIG. 1, the watercraft 100 comprises a watercraft body 102 that is defined by a bow 104, a stern 106, a freeboard region 108, and a draft region 110. The bow 104 orients in a forward direction of the watercraft body 102. The stern 106 faces the rearward end of the watercraft body 102. The freeboard region 108 is above the waterline, and may form a passenger cavity to receive the watercraft operator 136, or a passenger riding in the watercraft that is following a preprogrammed navigation route.

Figure 2:
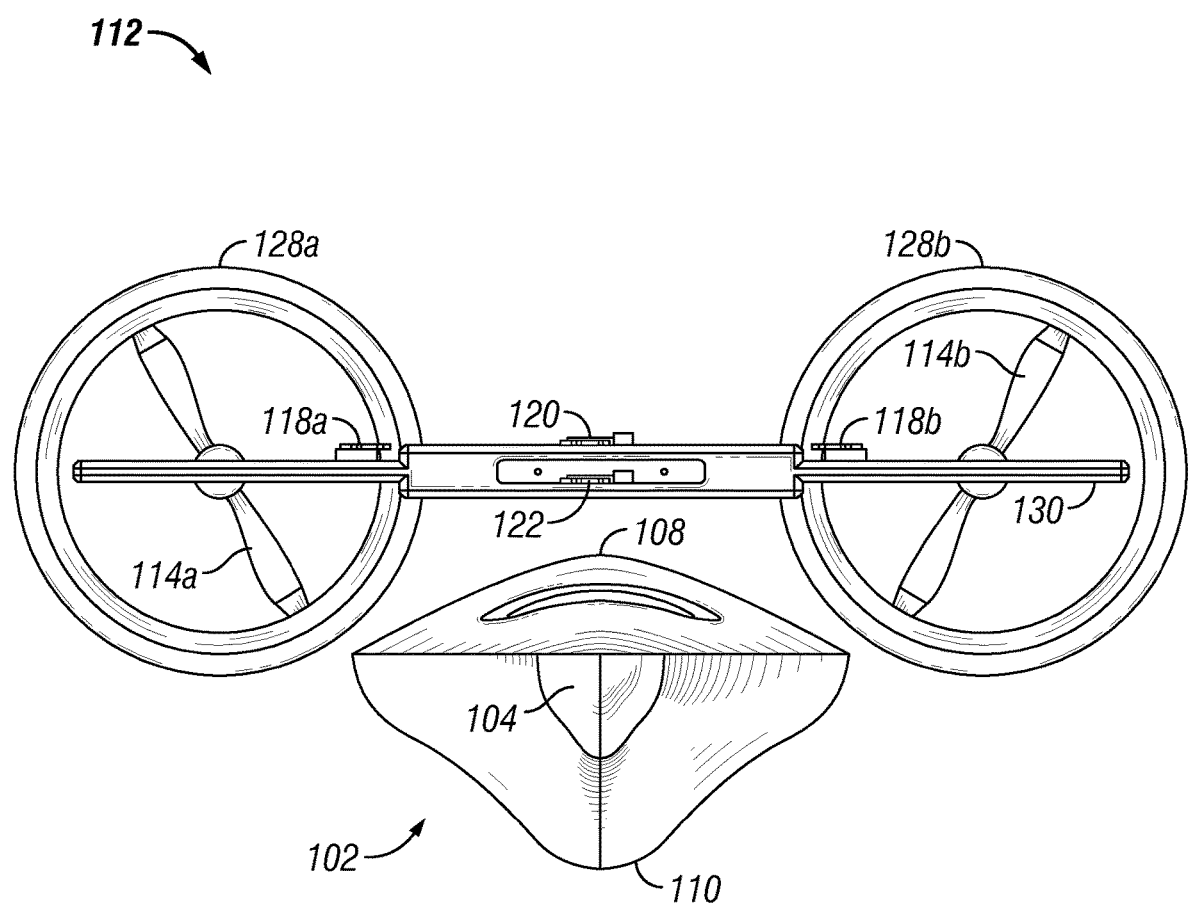
FIG. 2 illustrates a frontal view of the propeller-powered propulsion system shown in FIG. 1, in accordance with an embodiment of the present invention.

Continuing with the components of the watercraft body 102, FIG. 2 illustrates the draft region 110 that is at least partially submerged below the waterline, depending on buoyancy of the watercraft 100. The draft region 110 is below the waterline, while the aforementioned freeboard region 108 extends from the waterline to the upper surface of the watercraft body 102. In some embodiments, the watercraft body 102 may include, without limitation, a kayak, a flat-bottomed boat, a dual aquatic craft, a multi-hulled aquatic craft, an outrigger, and a catamaran.

Figure 3:
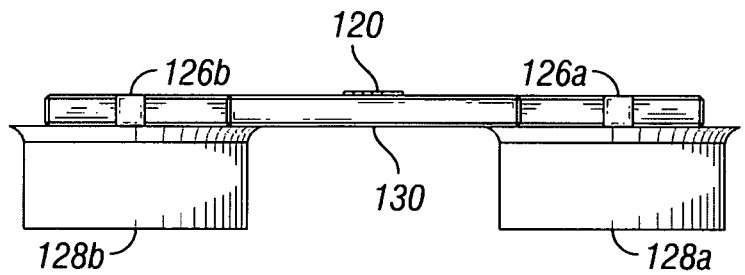
FIG. 3 illustrates a top view of an exemplary propeller subassembly, in accordance with an embodiment of the present invention.

For propulsion and steering, the watercraft body 102 carries a propeller subassembly 112, shown in FIG. 3. In one embodiment, the propeller subassembly 112 is fixedly joined to the freeboard region 108 of the watercraft 100, 106. This rearward disposition creates greater leverage for forward thrust and precise steering. The watercraft 100 is unique in that the propeller subassembly 112, described below, remains above the waterline, accessible to remote control signals and minimizing damage to aquaculture below the waterline. In some embodiments, the propeller subassembly 112 may be bow or stern mounted.

The propellers 114a-b are generally elevated above a waterline on which the watercraft body 102 floats. This creates an "air-boat" configuration, rather than having the propellers 114a-b immersed in the water. In any case, the propellers 114a-b allow the watercraft 100 to navigate in shallow waters because of their elevated disposition on the watercraft 100. Those skilled in the art will recognize that in-water propeller driven blades can tangle with weeds and are not efficient in shallow waters. In one embodiment, the propeller 114a is a single-blade propeller, as is known in the art of kayaks and paddle boards. In yet another embodiment, any number of propellers/blades may be used to operate the watercraft in substantially the same manner. In any case, the propellers 114a-b are not immersed in the water, but remain above the waterline. This is a standard "air screw" known in the art.

In some embodiments, the propeller subassembly 112 may detachably mount to the watercraft body 102 through a frame 130, fasteners, and other propeller mounting means known in the art. The frame 130 may include a horizontal, linear bar extending from starboard side to port side. Though in other embodiments, the propeller subassembly 112 may be fixedly secured proximal to the bow 104 of the watercraft 100. Though it is preferable not to fixedly secure the propeller subassembly 112 to the bow 104.

Figure 4:
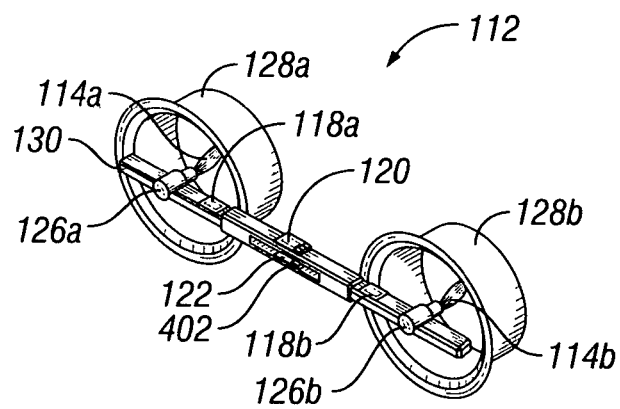
FIG. 4 illustrates a perspective view of the propeller subassembly, in accordance with an embodiment of the present invention.

As FIG. 4 references, the propeller subassembly 112 comprising a plurality of propellers 114a-b that are independently operable to propel and steer the watercraft body 102. In one non-limiting embodiment, the propellers 114a, 114b include two spaced-apart, coplanar propellers. The propellers 114a-b may also include a plurality of broad, angled blades. Other propeller types used in watercraft systems may also be used. Though in other embodiments, more than two propellers 114a-b may be used. In one embodiment, a first propeller 114a is operational on the port side of the watercraft body 102, and a second propeller 114b is operational on the starboard side of the watercraft 100 (FIG. 1).

In one embodiment, the horizontal frame 130 supports the propeller motor 114a-b, providing a stable mounting surface on the watercraft 100. Though this configuration may change. In other embodiments, a pivoting mechanism pivots the propellers 114a-b through a 360° arc about a transverse horizontal axis from a first position in which the propeller produce a forward thrust, through a second position in which the propeller produces a reverse thrust, to a third position in which one or more of the propellers 114*a-b* produces a neutral thrust and a turning torque. In other embodiments however, the propellers 114*a-b* are stationary, remaining parallel to the watercraft 100 and substantially horizontal to the waterline. In any case, the propellers 114*a-b* operate independently of each other, with each propeller having its own motor 116*a-b* and electronic speed control.

Figure 5:
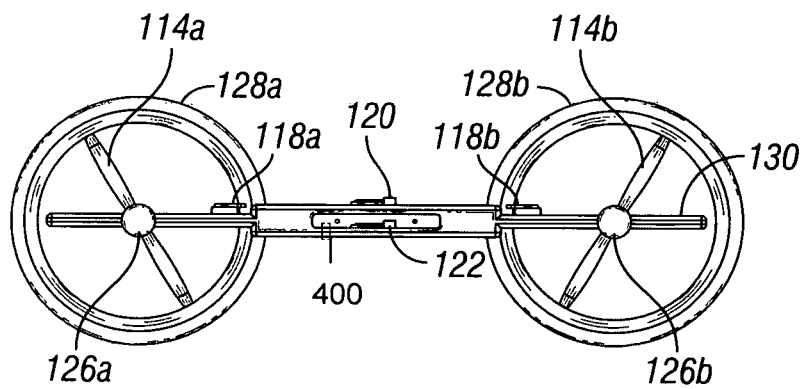
FIG. 5 illustrates a frontal view of the propeller subassembly, in accordance with an embodiment of the present invention.

In some embodiments, the watercraft 100 may also include at least one motor 116*a-b* that powers the propeller subassembly 112. The motor 116*a-b* may include a DC motor. In one The DC motor 116*a*, 116*b* is brushless and may include an electronically commutated motor, or a synchronous DC motor powered by DC electricity via an inverter or switching power supply which produces an AC electric current to drive each phase of the motor 116*a-b* via a closed loop controller. Other types of motors may also be used. As shown in FIG. 5, a frame 130 supports a motor mount 126*a-b* that fastens the motor 116*a-b* to the watercraft body 102. The frame 130 may include a rigid linear member that traverses the watercraft body 102 from port side to starboard side. As illustrated in FIGS. 2 and 5, the rotational axis of each DC motor 116*a*, 116*b* may be disposed in-plane with the frame 130.

Figure 6:
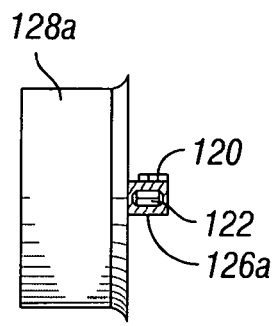
FIG. 6 illustrates an elevated side view of an exemplary propeller covered with a shroud, in accordance with an embodiment of the present invention.

Turning now to FIG. 6, the propeller subassembly 112 may also include a shroud 128*a-b* with integrated motor mount 126*a*, 126*b* that are utilized by the watercraft 100 to both, cover and mount the motor 116*a-b*. The shroud 128*a*, 128*b* may include a circular-shaped rigid cover that protects the operator 136 from engaging the rotating propellers 114*a-b*. Though in other embodiments, a welded wire spider web configuration provides this protection. In one embodiment, the propellers 114*a-b* have no inner mechanism and the shroud 128*a-b* does not protect components from moisture or other contaminants. The shroud 128*a-b* does help prevent injuries however. The shroud 128*a-b* also has a duct that increases thrust efficiency and reduces noise, which is significant.

Looking again at FIG. 4, a voltage distribution board 402 distributes power from the battery through the ESC 118*a*, 118*b* to the motor 116*a-b*. In other embodiments, power is distributed to ESCs and voltage regulator circuit. The VRC connects microcomputer 120 and USB ports. In yet other embodiments, electronic speed controllers 118*a-b* regulate the motor 116*a-b*. In other embodiments, the electronic speed controller 118*a* is operable at 80 amps or more. In other embodiments, a microcomputer 120 operatively connects to the electronic speed controller 118*b*.

In one possible embodiment, the microcomputer 120 comprises software that is operable to control the electronic speed controllers 118*a-b* through a pulse width modulation signal. In some embodiments, a battery 400 powers the motor 116*a-b* (See FIG. 5). In other embodiments, the battery 400 may also power the electronic speed controllers 118*a-b*, the microcomputer 120, and the voltage distribution board. In one embodiment, the battery 400 includes a 12-volt battery.

Those skilled in the art will recognize that pulse width modulation signal comprises a digital signal that reduces the average power delivered by an electrical signal, by chopping the electrical signal into discrete parts. The average value of voltage fed to the load is controlled by turning the switch between supply and load on and off at a fast rate. In one possible embodiment, the microcontroller also includes a general purpose input/output header (GPIO) operatively connected to the electronic speed controllers 118*a-b*. The GPIO may include an uncommitted digital signal pin on an integrated circuit or electronic circuit board whose behavior—including whether it acts as input or output—is controllable at run time.

As shown back in FIG. 1, the watercraft 100 provides a receiver 122 that operatively connects to the microcomputer 120 and the propeller subassembly 112. The receiver 122 operable to receive a command signal 132, described below. In one embodiment, the receiver 122 comprises an antenna to capture radio waves and other types of signals, including the command signal. In some embodiments, the receiver 122 may include a GPS receiver. Though in other embodiments, the receiver 122 may include an infra-red receiver, a Bluetooth receiver, a motion detecting receiver, voice control, or combinations thereof.

The microcontroller converts the command signal 132 to at least one speed for each propeller independently of the other. For example, as the propeller speeds are varied, the watercraft body 102 accelerates, decelerates, and steers port side or starboard side. In some embodiments, the watercraft 100 includes a mobile communication device 124 that is operable to transmit the command signal 132. In other embodiments, the mobile communication device 124 communicates with the receiver 122 and the GPS system 134 through Wi-Fi, or Bluetooth. In one embodiment, the mobile communication device 124 comprises an iPhone with iOS operating system. Though in other embodiments, any smart phone, radio controller, transmitter, transceiver, computer, or tablet may be used to communicate with the receiver 122.

In one non-limiting embodiment, the mobile communication device 124 comprises an operating system for accessing graphical user interfaces and performing additional functions. The operating system may include, without limitation, iOS™, Android™, Linux™, and Windows™. In yet another embodiment, the propulsion system 100 further comprises a cable control device or a smart phone that transmits the command signal 132 to the receiver 122.

The mobile communication device 124 is also operable to acquire location data of the watercraft body 102 obtained by a GPS system 134. The microcomputer 120 processes the location data to automate navigation of the watercraft 100 in at least one preprogrammed navigation route. The navigation route is defined as a series of one or more course changes defined by multiple waypoints. The speed and operation of the propellers 114*a-b* (either together, or independently of each other) determine the navigation route travelled by the watercraft body 102. In some embodiments, the propellers 114*a-b* propel the watercraft body 102 at a disproportionate thrust, and at a speed and a direction along the selected navigation route in accordance with the transmitted remote-control signal.

In some embodiments, the navigation routes may include, without limitation, a waypoint navigation, home point return navigation, steady course navigation, valet navigation, and stationary positioning. Though other navigation routes may be preprogrammed or controlled during navigation of the watercraft body 102. The navigation routes may be controlled through a single button operation from the chosen controller of a physical mobile communication device 124, a cable, or a remote-control device.

The waypoint navigation route is defined as the route of the watercraft body 102 to an intermediate point or place on a route or line of travel in the waterway. This could also include a stopping point or point at which course is changed during travel. The home point return navigation route is defined as the route of the watercraft body 102 to return to a predetermined point of origin from an offshore position. In this navigation route, the global positioning system helps identify the location of the watercraft body 102 for this navigational route.

Further, the steady course navigation route maintains the watercraft body 102 at a steady route and speed along the waterway. Another route, the valet navigation route is followed autonomously when the watercraft body 102 is propelled offshore for security, and then returns to the point of origin when the operator 136 is ready to board the watercraft body 102. The GPS system 134 helps identify the location of the watercraft body 102 for valet navigation route. Thus, the GPS system 134 determines the position of the propeller subassembly 112, so as to automate navigation of the watercraft body 102 in the at least one navigation route discussed above, and customized by the watercraft operator 136.

Those skilled in the art will recognize that the global positioning system provides geolocation and time information to the GPS receiver anywhere on or near the Earth where there is an unobstructed line of sight to four or more GPS satellites. Thus, by locating the watercraft 100 in the waterway, it is possible to navigate the watercraft body 102 along a desired navigation route. In other embodiments however, an Inertial Navigation System (INS) may be used for basic navigation of the watercraft body 102. Yet another valet navigation option is to use depth soundings and compass. For example, to proceed at 280° until the depth of the draft region 110 reaches 20'.

In operation, the watercraft operator 136 interfaces with the mobile communication device 124 to transmit the command signal 132 to the receiver 122, whereby the microcomputer 120 interprets the command signal 132 and transmits the pulse width modulation signal to the electronic speed controllers 118a-b. This causes the electronic speed controllers 118a-b transmit voltage to the motor 116a-b. A subsequent action is that the motor 116a-b spins the propellers 114a-b, whereby the propellers 114a-b create thrust to propel and steer the watercraft 100. In another embodiment, the mechanical actions are actuated through a cable, or wire. The wired configuration operates substantially the same as the wireless configuration described above. A wire controller, or other known mechanism in the art, is used to transmit voltage to the motor 116a-b, cause the motor 116a-b to spin the propellers 114a-b, and create thrust with the propellers 114a-b to propel and steer the watercraft.

Figure 7:
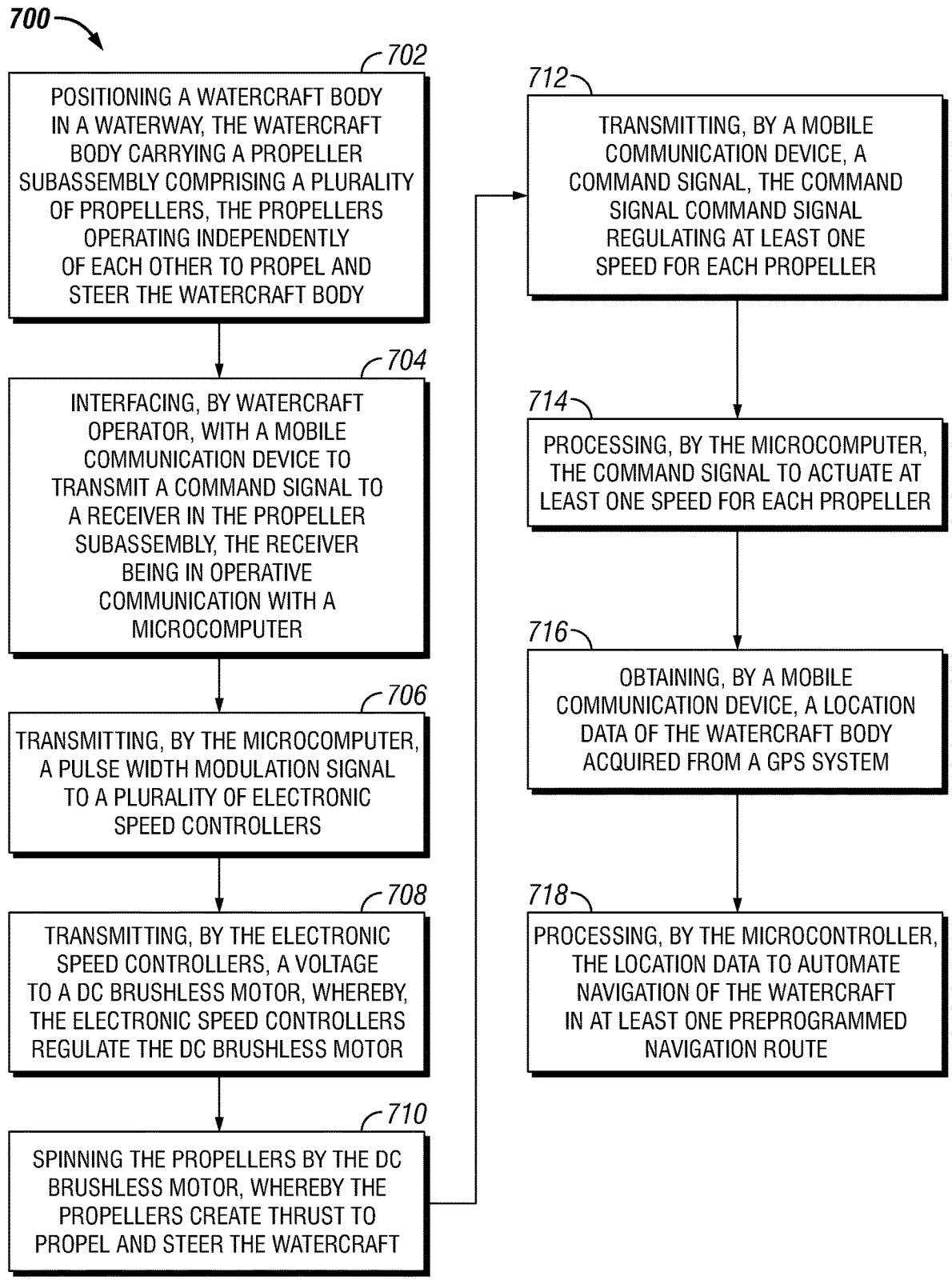
FIG. 7 illustrates a flowchart of an exemplary method of remote-controlled waterway navigation with a propeller-powered propulsion system, in accordance with an embodiment of the present invention.

FIG. 7 illustrates a flowchart of an exemplary method 700 of remote-controlled waterway navigation with a propeller-powered watercraft. The method 700 may include an initial Step 702 of positioning a watercraft body in a waterway, the watercraft body carrying a propeller subassembly comprising a plurality of propellers, the propellers operating independently of each other to propel and steer the watercraft body.

The method 700 may further comprise a Step 704 of interfacing, by a watercraft operator, with a mobile communication device to transmit a command signal to a receiver in the propeller subassembly, the receiver being in operative communication with a microcomputer. A Step 706 includes transmitting, by the microcomputer, a pulse width modulation signal to a plurality of electronic speed controllers. In some embodiments, a Step 708 comprises transmitting, by the electronic speed controllers, a voltage to a DC brushless motor, whereby the electronic speed controllers regulate the DC brushless motor. A Step 710 includes spinning the propellers by the DC brushless motor, whereby the propellers create thrust to propel and steer the watercraft. The propellers 114a, 114b operate independently of each other.

In some embodiments, a Step 712 may include transmitting, by a mobile communication device, a command signal, the command signal command signal regulating at least one speed for each propeller. The gear mechanism for the propellers is configured with multiple speeds, torques, and speed ranges. This includes a reverse gear. In this manner, multiple speeds and forward-reverse operation of the watercraft is possible. Other propeller gears known in the art of boats and watercraft may also be used. A Step 714 comprises processing, by the microcomputer, the command signal to actuate at least one speed for each propeller.

The method 700 may further comprise a Step 716 of obtaining, by a mobile communication device, a location data of the watercraft body acquired from a GPS system. A final Step 718 includes processing, by the microcontroller, the location data to automate navigation of the watercraft in at least one preprogrammed navigation route. The microcomputer 120 processes the location data to automate navigation of the watercraft 100 in at least one preprogrammed navigation route. In other embodiments, the watercraft is operable without a GPS system. The watercraft is controlled simply by the remote control unit, or in some embodiments, a user riding directly on the watercraft and controlling through mechanical steering means known in the art of watercraft control.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A propeller-powered propulsion system watercraft comprising:
    a watercraft body defined by a bow, a stern, a freeboard region, and a draft region;
    a propeller subassembly having a pair of dual fixed propellers joined to the freeboard region of the watercraft, proximal to the stern, the dual fixed propellers independently operable to maneuver the watercraft body via disproportionate thrust,
    whereby the propulsion speed and steering is affected by the dual fixed propellers;
    at least one motor powering the propeller subassembly;
    a shroud having a pair of integrated motor mounts, the shroud configured to cover and mount the motor;
    a horizontal frame disposed horizontally across the freeboard region of the watercraft, the horizontal frame detachably joined to the freeboard region of the watercraft, the horizontal frame supporting the at least one motor of the propeller subassembly, whereby the propeller subassembly detachably mounts the watercraft;

the at least one motor having a rotational axis disposed in-plane with the horizontal frame;

multiple electronic speed controllers regulating the motor, the electronic speed controllers protectively covered, and supported by the frame;

a microcomputer operatively connected to the electronic speed controller, the microcomputer comprising software operable to control the electronic speed controller, the microcontroller protectively covered, and supported by the frame;

a receiver operatively connected to the microcomputer and the propeller subassembly, the receiver operable to receive a command signal, whereby the microcontroller converts the command signal to at least one speed for each propeller independently of the other; and a mobile communication device being operable to transmit the command signal.

2. The watercraft of claim 1, wherein the mobile communication device further being operable to acquire location data of the watercraft body obtained by a GPS system, whereby the microcontroller processes the location data to automate navigation of the watercraft.

3. The watercraft of claim 2, wherein the microcontroller processes the location data to automate the navigation of the watercraft in at least one navigation route.

4. The watercraft of claim 3, wherein the navigation route includes at least one of the following: a waypoint navigation, a home point return navigation, a steady course navigation, valet navigation, and stationary positioning.

5. The watercraft of claim 1, wherein the propellers comprise two spaced-apart, coplanar propellers.

6. The watercraft of claim 5, wherein the propellers comprise a plurality of angled blades.

7. The watercraft of claim 1, includes a personal communication device comprising an operating system.

8. The watercraft of claim 7, wherein the mobile communication device communicates with the receiver and the GPS system through Wi-Fi, or Bluetooth, or both.

9. The watercraft of claim 1, further comprising a voltage distribution board distributing power from a battery to a DC brushless motor.

10. The watercraft of claim 9, wherein the battery powers at least one of the following: the motor, the electronic speed controllers, the microcomputer, and the voltage distribution board.

11. The watercraft of claim 1, wherein the motor comprises a DC brushless motor.

12. The watercraft of claim 1, wherein the microcontroller comprising a general purpose input/output header operatively connected to the electronic speed controllers.

13. The watercraft of claim 1, further comprising a cable control device, the cable control device transmitting the command signal to the receiver.

14. The watercraft of claim 1, wherein the microcomputer comprises software operable to control the electronic speed controller through a pulse width modulation signal.

15. The watercraft of claim 14, wherein a watercraft operator interfaces with the mobile communication device to transmit the command signal to the receiver, whereby the microcomputer interprets the command signal and transmits the pulse width modulation signal to the electronic speed controllers, whereby the electronic speed controllers transmit voltage to the motor, whereby the motor spins the propellers, whereby the propellers create thrust to propel and steer the watercraft.

16. A propeller-powered watercraft comprising:

a watercraft body defined by a bow, a stern, a freeboard region, and a draft region;

a propeller subassembly having a pair of dual fixed propellers joined to the freeboard region of the watercraft, proximal to the stern, the dual fixed propellers independently operable to maneuver the watercraft body via disproportionate thrust, whereby the propulsion speed and steering is affected by the dual fixed propellers;

at least one DC motor powering the propeller subassembly;

a shroud having a pair of integrated DC brushless motor mounts, the shroud configured to cover and mount the DC brushless motor;

a horizontal frame disposed horizontally across the freeboard region of the watercraft, the horizontal frame detachably joined to the freeboard region of the watercraft, the horizontal frame supporting the at least one motor of the propeller subassembly, whereby the propeller subassembly detachably mounts the watercraft;

the at least one DC motor having a rotational axis disposed in-plane with the horizontal frame;

an electronic speed controllers regulating the at least one DC motor;

a microcomputer operatively connected to the electronic speed controller, the microcomputer comprising software operable to control the electronic speed controller through a pulse width modulation signal, the microcontroller further comprising a general purpose input/output header operatively connected to the electronic speed controllers;

a receiver operatively connected to the microcomputer and the propeller subassembly, the receiver operable to receive a command signal, whereby the microcontroller converts the command signal to at least one speed for each propeller independently of the other; and a mobile communication device being operable to transmit the command signal, the mobile communication device further being operable to acquire location data of the watercraft body obtained by a GPS system, whereby the mobile communication device communicates with the receiver and the GPS system through Wi-Fi, or Bluetooth, or both, whereby the microcontroller processes the location data to automate navigation of the watercraft in at least one preprogrammed navigation route.

17. The watercraft of claim 16, wherein a watercraft operator interfaces with the mobile communication device to transmit the command signal to the receiver, whereby the microcomputer interprets the command signal and transmits the pulse width modulation signal to the electronic speed controllers, whereby the electronic speed controllers transmit voltage to the DC brushless motor, whereby the DC brushless motor spins the propellers, whereby the propellers create thrust to propel and steer the watercraft.

18. A method of remote-controlled waterway navigation with a propeller-powered watercraft, the method comprising:

positioning a watercraft body in a waterway, the watercraft body carrying a horizontal frame that supports a propeller subassembly having a pair of dual fixed propellers joined to the freeboard region of the watercraft, proximal to the stern, the dual fixed propellers each having a rotational axis disposed in-plane with the horizontal frame and independently operable to maneuver the watercraft body via disproportionate thrust;

whereby the propulsion speed and steering is affected by the horizontal frame supporting the dual fixed propellers;

interfacing, by a watercraft operator, with a mobile communication device to transmit a command signal to a receiver in the propeller subassembly, the receiver being in operative communication with a microcomputer;

transmitting, by the microcomputer, a pulse width modulation signal to a plurality of electronic speed controllers;

transmitting, by the electronic speed controllers, a voltage to a DC motor, whereby, the electronic speed controllers regulate the DC motor;

spinning the propellers by the DC motor, whereby the propellers create thrust to propel and steer the watercraft;

transmitting, by the mobile communication device, a command signal, the command signal command signal regulating at least one speed for each propeller;

processing, by the microcomputer, the command signal to actuate at least one speed for each propeller;

obtaining, by the mobile communication device, a location data of the watercraft body acquired from a GPS system; and processing, by the microcontroller, the location data to automate navigation of the watercraft in at least one preprogrammed navigation route.

* * * * *